US009845884B2

(12) United States Patent
Lutjen et al.

(10) Patent No.: US 9,845,884 B2
(45) Date of Patent: Dec. 19, 2017

(54) BRUSH SEAL WITH SINGLE-LAYER MIXED-DIAMETER BRISTLE PACK (71) Applicant: United Technologies Corporation, Hartford, CT (US)

(72) Inventors: Paul M. Lutjen, Kennenbunkport, ME (US); Jose R. Paulino, Saco, ME (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/073,224

(22) Filed: Mar. 17, 2016

(65) Prior Publication Data
US 2017/0268678 A1    Sep. 21, 2017

(51) Int. Cl.
   *F16J 15/32*      (2016.01)
   *F16J 15/3288*    (2016.01)
   *F01D 11/08*      (2006.01)
   *F01D 11/00*      (2006.01)

(52) U.S. Cl.
   CPC ......... *F16J 15/3288* (2013.01); *F01D 11/001* (2013.01); *F01D 11/08* (2013.01); *F05D 2220/32* (2013.01); *F05D 2240/12* (2013.01); *F05D 2240/30* (2013.01); *F05D 2240/56* (2013.01); *F05D 2300/17* (2013.01)

(58) Field of Classification Search
   CPC .. F16J 15/3284; F16J 15/3288; F01D 11/001; F01D 11/08; F05D 2240/55; F05D 2240/57
   See application file for complete search history.

(56) References Cited

U.S. PATENT DOCUMENTS

| 4,678,113 | A  | 7/1987  | Bridges |
| 5,090,710 | A  | 2/1992  | Flower |
| 5,114,159 | A  | 5/1992  | Baird |
| 5,181,728 | A  | 1/1993  | Stec |
| 5,201,530 | A  | 4/1993  | Kelch |
| 5,265,412 | A  | 11/1993 | Bagepalli |
| 5,794,938 | A  | 8/1998  | Hofner |
| 5,927,721 | A  | 7/1999  | Schulze |
| 6,170,831 | B1 | 1/2001  | Bouchard |
| 6,231,047 | B1* | 5/2001 | Cunningham ....... F16J 15/3288 |
|           |    |         | 277/355 |
| 6,250,640 | B1 | 6/2001  | Wolfe |
| 6,302,400 | B1 | 10/2001 | Werner |
| 6,357,672 | B1 | 3/2002  | Cowan |
| 6,406,027 | B1 | 6/2002  | Aksit |
| 6,431,827 | B1 | 8/2002  | Wolfe |
| 6,488,471 | B1 | 12/2002 | Stibich |
| 6,601,853 | B2 | 8/2003  | Inoue |
| 6,695,314 | B1 | 2/2004  | Gail |
| 6,808,179 | B1* | 10/2004 | Bhattacharyya ........ F01D 11/00 |
|           |    |         | 277/348 |

(Continued)

FOREIGN PATENT DOCUMENTS

WO    2014/158589    10/2014

*Primary Examiner* — Gilbert Lee
(74) *Attorney, Agent, or Firm* — O'Shea Getz P.C.

(57) ABSTRACT

Aspects of the disclosure are directed to a brush seal comprising: a bristle pack that includes: a first plurality of bristles, each of the first plurality of bristles having a first dimension, and a second plurality of bristles, each of the second plurality of bristles having a second dimension that is different from the first dimension, where a ratio of the first dimension to the second dimension has a range of 2:1 to 5:1.

17 Claims, 6 Drawing Sheets (56) References Cited

U.S. PATENT DOCUMENTS

| | | |
|---|---|---|
| 7,644,928 B2 | 1/2010 | Beichl |
| 7,653,993 B2 | 2/2010 | Couture |
| 8,727,354 B2 | 5/2014 | Addis |
| 8,864,138 B2 | 10/2014 | Dos Santos |
| 2003/0178777 A1 | 9/2003 | Szymbor |
| 2004/0100030 A1 | 5/2004 | Addis |
| 2005/0006851 A1 | 1/2005 | Addis |
| 2008/0003099 A1 | 1/2008 | Giesler |
| 2008/0284107 A1 | 11/2008 | Flaherty |
| 2009/0315272 A1* | 12/2009 | Kasahara .............. F01D 11/003 277/355 |
| 2011/0227289 A1 | 9/2011 | Stefan |
| 2012/0195741 A1 | 8/2012 | Sarawate |
| 2012/0326393 A1 | 12/2012 | Zheng |
| 2015/0300191 A1 | 10/2015 | Morreale |
| 2015/0322816 A1 | 11/2015 | Schmitz |

\* cited by examiner

BRUSH SEAL WITH SINGLE-LAYER MIXED-DIAMETER BRISTLE PACK

BACKGROUND

Seals are used in an aircraft engine to isolate a fluid from one or more areas/regions of the engine. For example, seals are used to control various characteristics (e.g., temperature, pressure) within the areas/regions of the engine and ensure proper/efficient engine operation and stability.

Brush seals are a type of seal used to provide for fluid isolation in the manner described above. A brush seal may be implemented as a bundle/package of bristles sandwiched between two plates. Conventionally, the brush seal is manufactured with a plurality of wires/bristles, where each bristle is typically of the same size or diameter (disregarding any potential differences due to tolerances in manufacture of the bristles). Generally, smaller diameter bristles provide for better sealing capability. But, such enhanced sealing capability comes at the expense of a loss of strength.

Due in part to recent developments in engine design, engines are trending towards increased operating temperatures and pressures. At elevated temperatures (e.g., temperatures above a threshold amount), the seal experiences a loss of material properties/capabilities. If the seal is exposed to increased pressure/pressure drop (e.g., a pressure or pressure drop greater than a threshold) the seal's "blow-over capability" or ability to withstand load can be compromised.

What is needed is an improved brush seal that is better suited to operate in engine environments characterized by high temperature and high pressure.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a brush seal comprising: a bristle pack that includes: a first plurality of bristles, each of the first plurality of bristles having a first dimension, and a second plurality of bristles, each of the second plurality of bristles having a second dimension that is different from the first dimension, where a ratio of the first dimension to the second dimension has a range of 2:1 to 5:1. In some embodiments, the brush seal further comprises a first plate, and a second plate, where the first plate and the second plate house the bristle pack. In some embodiments, the first dimension is approximately equal to 178 micrometers and the second dimension is approximately equal to 74 micrometers. In some embodiments, the first plurality of bristles and the second plurality of bristles are substantially round in terms of form factor. In some embodiments, the first dimension corresponds to a first diameter and the second dimension corresponds to a second diameter. In some embodiments, the first plurality of bristles includes a first material and the second plurality of bristles includes a second material that is different from the first material. In some embodiments, the first material includes nickel or a nickel alloy. In some embodiments, the second material includes cobalt or a cobalt alloy. In some embodiments, the second material includes cobalt or a cobalt alloy. In some embodiments, the brush seal is configured as a full-hoop structure. In some embodiments, the brush seal is configured as a segment, and the segment is configured to be coupled to at least a second segment as part of a ring or hoop. In some embodiments, the brush seal is configured to be incorporated as part of an engine. In some embodiments, the brush seal is configured to be incorporated as part of a turbine section of the engine or a compressor section of the engine. In some embodiments, the brush seal is configured to interface to at least one of a blade of the engine, a vane of the engine, a rotating structure of the engine, or a static structure of the engine. In some embodiments, a span of at least one the first plurality of bristles or the second plurality of bristles is substantially oriented in one of an axial reference direction of the engine or a radial reference direction of the engine. In some embodiments, at least a portion of the first plurality of bristles and the second plurality conform to a heliocentric pattern with a first of the first plurality of bristles located at a respective center of the heliocentric pattern and a multiple of the second plurality of bristles located completely around a perimeter of the first of the first plurality of bristles. In some embodiments, the first dimension is greater than the second dimension, and a first count of the first plurality of bristles is different from a second count of the second plurality of bristles. In some embodiments, the first count is less than the second count. In some embodiments, the ratio of the first dimension to the second dimension is approximately equal to 2.14:1.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described in connection with a seal configured for use on an engine. In some embodiments, a brush seal assembly may include a compressible core. The brush seal assembly may include a support/backing made of one or more materials (e.g., metal). The brush seal assembly may include a bristle pack formed from a plurality of bristles, where a first of the bristles may have a first dimension that is substantially different from a second dimension of a second of the bristles, where the first and second dimensions may be the same corresponding dimension.

Figure 1:
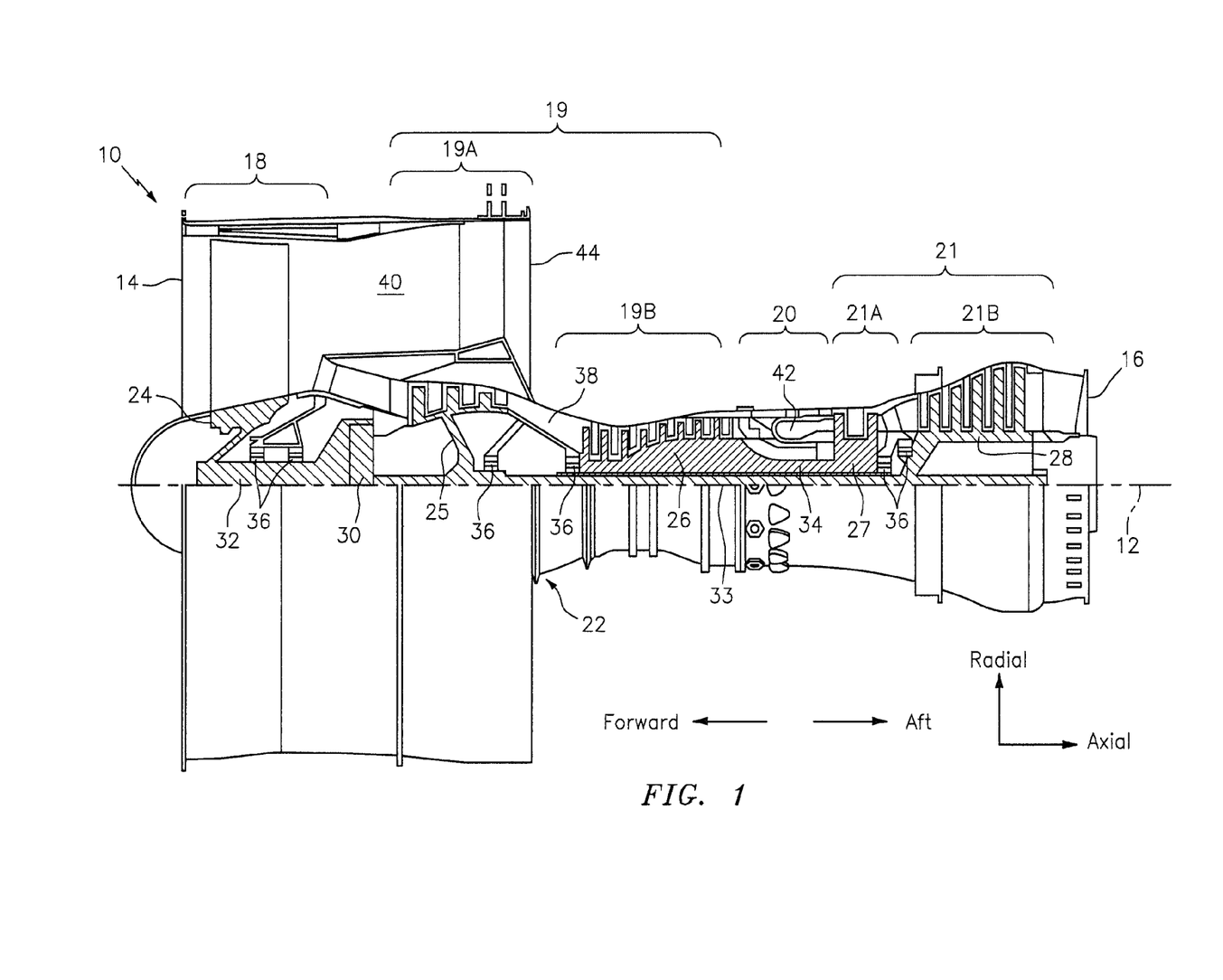
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines.

Figure 2A:
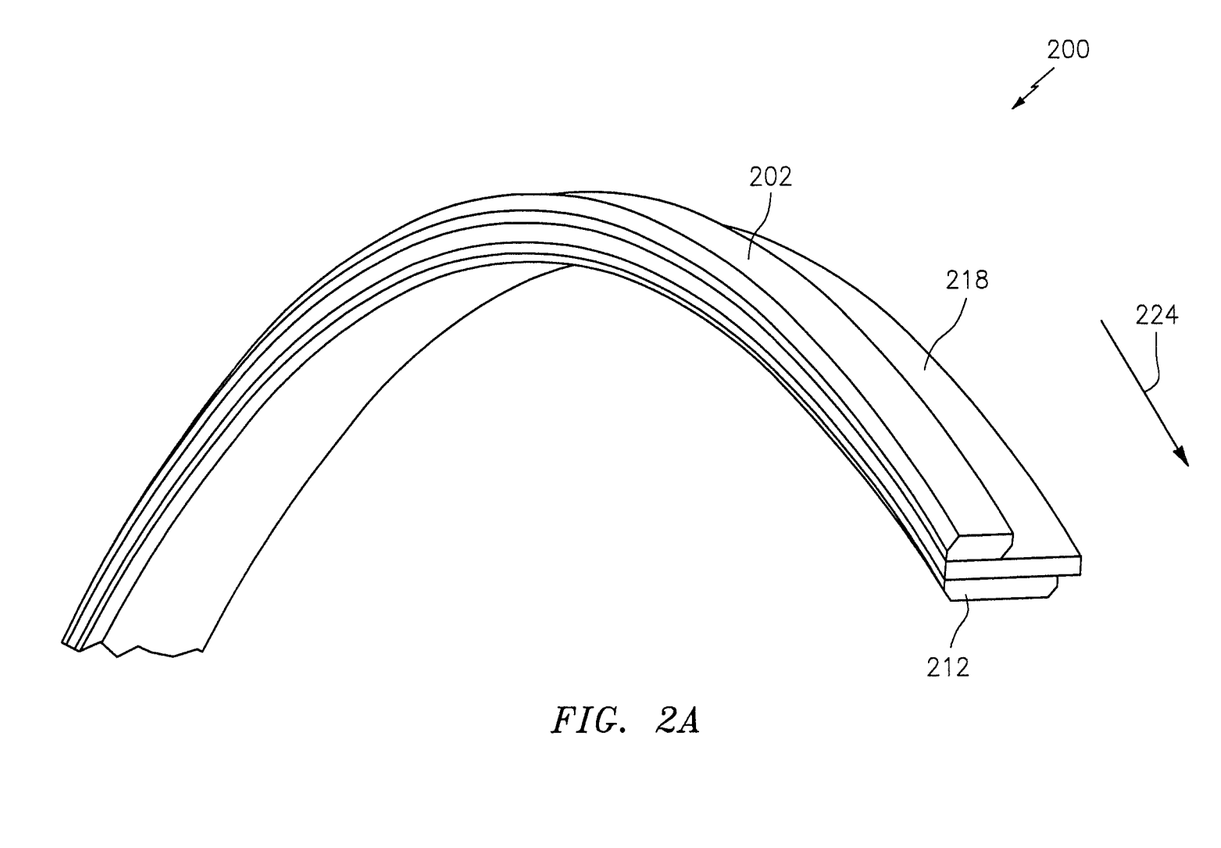
FIG. 2A illustrates a brush seal in accordance with one or more aspects of this disclosure.

Referring now to FIG. 2A, a brush seal 200 is shown. The seal 200 may be incorporated as part of one or more sections of the engine, such as for example the compressor section 19 or the turbine section 21 of the engine 10 of FIG. 1. In some embodiments, the seal 200 may be used to interface a vane or a blade of the engine 10. In some embodiments, the seal 200 may be used to interface rotating and static structure (e.g., as part of a pairing of a rotor and stator).

Figure 3A:
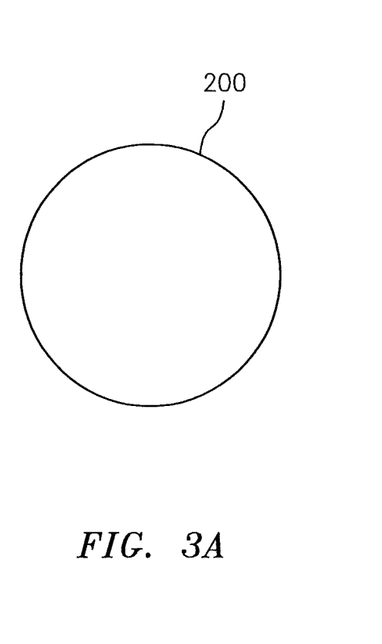
FIG. 3A illustrates the seal of FIG. 2A arranged as a full-hoop structure in accordance with aspects of this disclosure.
Figure 3B:
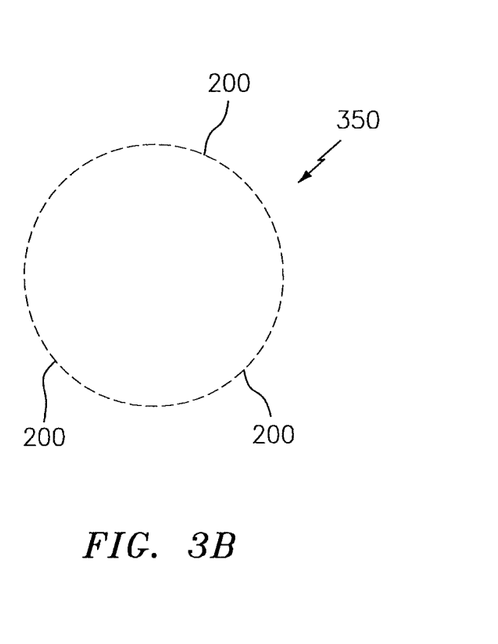
FIG. 3B illustrates a number of the seals of FIG. 2A arranged as a plurality of segments in forming a sealing structure in accordance with aspects of this disclosure.

The seal 200 may be manufactured as a full-hoop structure (see FIG. 3A). In some embodiments, the seal 200 may be manufactured as a split-structure/segments. The segments may be configured to be incorporated as part of a hoop or ring. For example, referring to FIG. 3B multiple segments of seals 200 may be used to form a larger sealing structure 350.

Referring back to FIG. 2A, the seal 200 may include one or more plates, such as for example a top, first plate 202 and a bottom/backing, second plate 212. The plates 202 and 212 may at least partially contain/house a bristle pack 218. The bristle pack 218 may include a plurality of wires/bristles as described further below. As shown, the bristle pack 218 may form a single layer with respect to the overall construction of the seal 200.

The bristle pack 218 may be oriented in one or more reference directions, such as for example the reference direction denoted by arrow 224. For example, a length/span of the bristles along the reference direction 224 may be substantially aligned with, or parallel to, the centerline 12 of the engine 10 of FIG. 1. In some embodiments, the length/span of the bristles along the reference direction 224 may be substantially aligned in the radial direction (e.g., pointing in-bound or towards the centerline 12 of the engine 10).

Figure 2B:
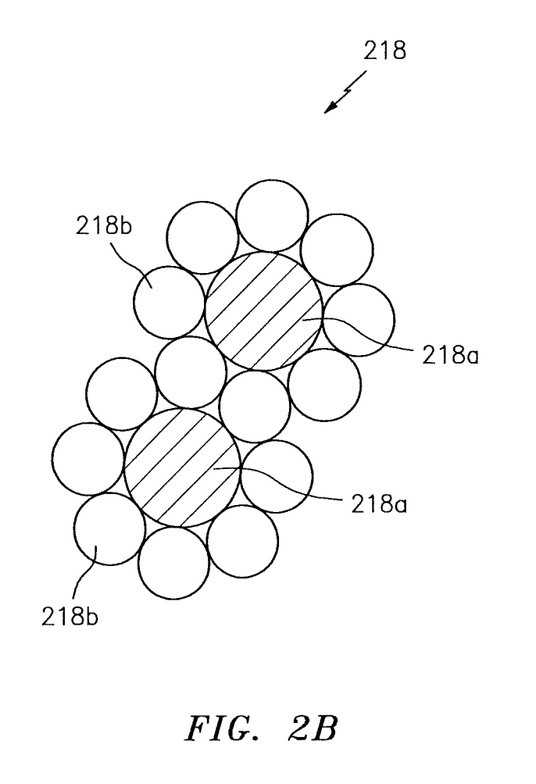
FIG. 2B illustrates an end perspective view of bristles of the seal of FIG. 2A in accordance with one or more aspects of this disclosure.

As shown in FIG. 2B, the bristle pack 218 may include bristles 218a having a first dimension and bristles 218b having a second dimension, where the first dimension may be substantially different from the second dimension (may be different in an amount greater than a threshold, taking into consideration a manufacturing tolerance associated with at least one of the first dimension or the second dimension). For example, the bristles 218a may be larger in size than the bristles 218b as shown in FIG. 2B.

Assuming a substantially round/circular form factor for the bristles 218a and 218b, the bristles 218a may have a diameter of approximately 0.006 inches (approximately 0.1524 millimeters) and the bristles 218b may have a diameter of approximately 0.0028 inches (approximately 0.07112 millimeters). Taking a ratio of the diameter of the bristles 218a to the diameter of the bristles 218b yields an approximate value of 0.006/0.0028 or 2.14/1 (2.14:1). In some embodiments, the ratio of the diameter of the bristles 218a to the diameter of the bristles 218b may range from 2:1 to 5:1. This range has been determined to impart sufficient strength while still providing adequate sealing capabilities.

As shown in FIG. 2B, the bristles 218a and 218b may conform to a heliocentric/isotropic style of pattern/configuration/distribution where a first type of the bristles (e.g., a bristle 218a) may be located at a respective center with a one or more of the second type of the bristles (e.g., the bristles 218b) located around the perimeter of the first type of bristles. The packaging of the bristles 218a and 218b may be such that the gaps/spaces between any two adjacent bristles may be reduced/minimized. For example, a given bristle 218a may be completely encircled by the bristles 218b.

Figure 2C:
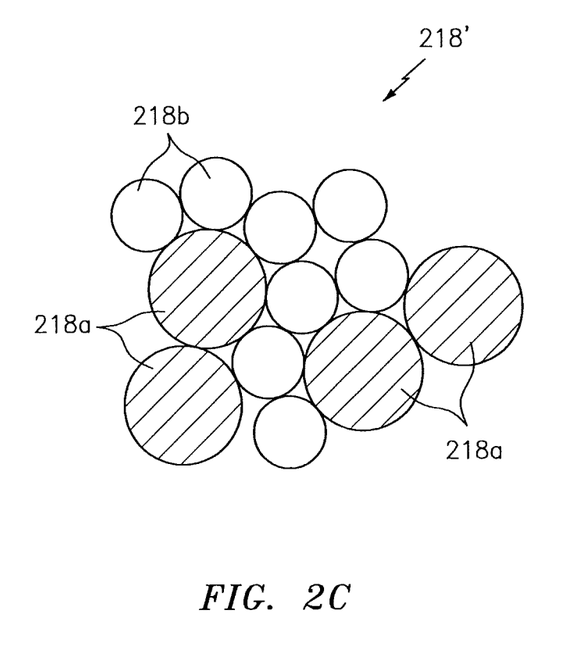
FIG. 2C illustrates an end perspective view of bristles of the seal of FIG. 2A in accordance with one or more aspects of this disclosure.
Figure 2D:
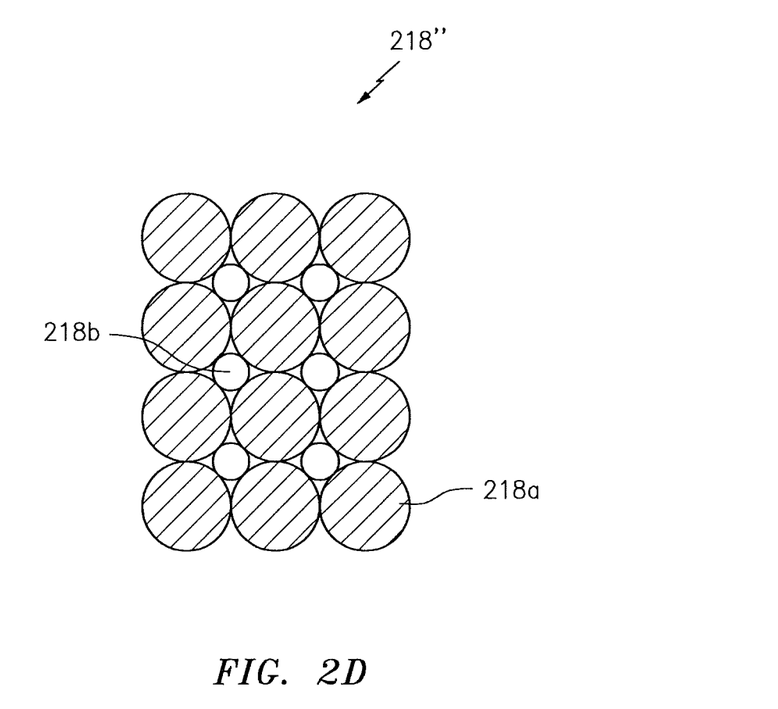
FIG. 2D illustrates an end perspective view of bristles of the seal of FIG. 2A in accordance with one or more aspects of this disclosure.

FIG. 2B represents an illustrative pattern for distributing bristles. Other patterns may be used. For example, the bristles 218a and 218b may be randomly interspersed relative to one another in forming a bristle pack 218' (see FIG. 2C). FIG. 2D illustrates a bristle pack 218" that is substantially grid-like in terms of the pattern of the bristles 218a and 218b. In FIG. 2D, the diameter of the bristles 218a may be approximately 0.007 inches (approximately 178 micrometers) and the diameter of the bristles 218b may be approximately 0.0029 inches (approximately 74 micrometers), yielding a ratio of approximately 2.41:1. Combinations of patterns may be used in some embodiments, where a first portion of a bristle pack may conform to a first pattern and a second portion of the bristle pack may conform to one or more additional patterns.

The respective counts of the bristles 218a and 218b in a bristle pack may be the same. In some embodiments, the respective counts of the bristles 218a and 218b in a bristle pack may be different from one another. For example, and as shown in FIG. 2B, the count of the bristles 218a may be less than the count of the bristles 218b in the bristle pack 218.

One or more materials may be used in forming the bristle pack 218. For example, the bristles 218a may be formed of a first material and the bristles 218b may be formed of a second material, where the first material may be different from the second material. In some embodiments, the bristles 218a may include nickel or a nickel alloy. In some embodiments, the bristles 218b may include cobalt or a cobalt alloy. The use of nickel or nickel alloy may impart strength to the bristle pack 218, whereas the use of cobalt or cobalt alloy may enable the bristle pack 218 to withstand wear.

Technical effects and benefits of this disclosure include a seal that may be incorporated as part of one or more sections of an engine. Relative to a conventional seal, a seal in accordance with this disclosure may have an extended usable lifetime and may be more reliable in terms of the range of temperatures and pressure/pressure drop that the seal can accommodate. Moreover, the seal may be able to accommodate a greater range of deflections while still providing for reliable performance.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A brush seal comprising:
    a bristle pack that includes:
        a first plurality of bristles, each of the first plurality of bristles having a first dimension; and
        a second plurality of bristles, each of the second plurality of bristles having a second dimension that is different from the first dimension,
    wherein a ratio of the first dimension to the second dimension has a range of 2:1 to 5:1,
    wherein the first dimension is greater than the second dimension,
    wherein a first count of the first plurality of bristles is less than a second count of the second plurality of bristles,
    wherein at least a portion of the first plurality of bristles and the second plurality of bristles conform to a heliocentric pattern with a first of the first plurality of bristles located at a respective center of the heliocentric pattern and a multiple of the second plurality of bristles located completely around a perimeter of the first of the first plurality of bristles, and
    wherein at least a second portion of the first plurality of bristles and the second plurality of bristles conform to a grid-like pattern with a first of the second plurality of bristles located at a respective center of the grid-like pattern and a multiple of the first plurality of bristles located completely around a perimeter of the first of the second plurality of bristles.

2. The brush seal of claim 1, further comprising:
    a first plate; and
    a second plate,
    wherein the first plate and the second plate house the bristle pack.

3. The brush seal of claim 1, wherein the first dimension is approximately equal to 178 micrometers and the second dimension is approximately equal to 74 micrometers.

4. The brush seal of claim 3, wherein the first plurality of bristles and the second plurality of bristles are substantially round in terms of form factor.

5. The brush seal of claim 4, wherein the first dimension corresponds to a first diameter and the second dimension corresponds to a second diameter.

6. The brush seal of claim 1, wherein the first plurality of bristles includes a first material and the second plurality of bristles includes a second material that is different from the first material.

7. The brush seal of claim 6, wherein the first material includes nickel or a nickel alloy.

8. The brush seal of claim 7, wherein the second material includes cobalt or a cobalt alloy.

9. The brush seal of claim 6, wherein the second material includes cobalt or a cobalt alloy.

10. The brush seal of claim 1, wherein the brush seal is configured as a full-hoop structure.

11. The brush seal of claim 1, wherein the brush seal is configured as a segment, and wherein the segment is configured to be coupled to at least a second segment as part of a ring or hoop.

12. The brush seal of claim 1, wherein the brush seal is configured to be incorporated as part of an engine.

13. The brush seal of claim 12, wherein the brush seal is configured to be incorporated as part of a turbine section of the engine or a compressor section of the engine.

14. The brush seal of claim 12, wherein the brush seal is configured to interface to at least one of a blade of the engine, a vane of the engine, a rotating structure of the engine, or a static structure of the engine.

15. The brush seal of claim 12, wherein a span of at least one the first plurality of bristles or the second plurality of bristles is substantially oriented in one of an axial reference direction of the engine or a radial reference direction of the engine.

16. The brush seal of claim 1, wherein the ratio of the first dimension to the second dimension is approximately equal to 2.14:1.

17. The brush seal of claim 1, wherein the bristle pack forms a single layer with respect to the brush seal.

* * * * *